(12) United States Patent
Martich et al.

(10) Patent No.: US 7,591,676 B2
(45) Date of Patent: Sep. 22, 2009

(54) ARCUATE PATCH PANEL ASSEMBLY

(75) Inventors: Mark E. Martich, Barrington, RI (US); Stewart A. Levesque, Scotland, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 11/347,628

(22) Filed: Feb. 3, 2006

(65) Prior Publication Data

US 2007/0184712 A1    Aug. 9, 2007

(51) Int. Cl.
H01R 13/60    (2006.01)

(52) U.S. Cl. ................................... 439/540.1

(58) Field of Classification Search .............. 439/540.1, 439/533, 719, 532, 557–558; 385/55, 134–135
See application file for complete search history.

(56) References Cited

U.S. PATENT DOCUMENTS

| | | |
|---|---|---|
| 4,630,886 A | 12/1986 | Lauriello et al. |
| 4,824,196 A | 4/1989 | Bylander |
| 4,995,688 A | 2/1991 | Anton et al. |
| 5,011,257 A | 4/1991 | Wettengel et al. |
| 5,129,842 A | 7/1992 | Morgan et al. |
| RE34,955 E | 5/1995 | Anton et al. |
| 5,530,954 A | 6/1996 | Larson et al. |
| 5,788,087 A | 8/1998 | Orlando |
| 5,903,698 A | 5/1999 | Poremba et al. |
| 6,293,707 B1 | 9/2001 | Wild |
| RE37,489 E | 1/2002 | Anton et al. |
| 6,537,106 B1 | 3/2003 | Follingstad |
| 6,600,106 B2 | 7/2003 | Standish et al. |
| 6,866,541 B2 | 3/2005 | Barker et al. |
| 6,901,200 B2 | 5/2005 | Schray |
| 6,918,786 B2 | 7/2005 | Barker et al. |
| 6,971,909 B2 | 12/2005 | Levesque et al. |
| 6,981,893 B2 | 1/2006 | Barker et al. |
| 7,070,459 B2 | 7/2006 | Denovich et al. |
| 7,094,095 B1 * | 8/2006 | Caveney .................. 439/540.1 |
| 2003/0022552 A1 | 1/2003 | Barker et al. |
| 2004/0209515 A1 | 10/2004 | Caveney et al. |

OTHER PUBLICATIONS

Eric W. Weisstein, Circular Segment, Mathworld, Wolfram Web Resource, http://mathworld.wolfram.com/CircularSegment.html, 3 pages.

(Continued)

*Primary Examiner*—Jean F Duverne
(74) *Attorney, Agent, or Firm*—McCarter & English, LLP

(57) ABSTRACT

A curved or arcuate patch panel is configured to be mounted to a rack or console. The patch panel facilitates cable management functions and enhances space utilization at and around the rack/patch panel assembly. The patch panel includes an elongated patch panel element having a predominantly curved length extent and exhibiting a peak region, preferably located at the center of the patch panel. The patch panel also includes flange members that extend from the elongated patch panel element, and that define a mounting face for the patch panel. Optionally, the flange members further define an extension arm that is intermediate to the mounting face and the elongated patch panel element. The extension arm is dimensioned to facilitate at least partial recessing of the elongated patch panel element relative to the rack/console when the patch panel is mounted thereto.

35 Claims, 5 Drawing Sheets

OTHER PUBLICATIONS

Hubbell catalog, front cover page, pp. 4, 31, 60, 61 and back cover page.

NORDX/CDT brochure entitled "IBDN Enhanced Connectivity," 4 pages, dated 1997.

Panduit® catalog, front cover page, pp. 5, 7, 8, 19, 59 through 67, and back cover page, dated 1996.

1996 Anixter catalog, front cover, pp. 1-6, 1-7, 1-20 through 1-24, 1-47, 1-48a, 1-49, 1-51, 1-80a, 1-129, 1-138, 1-161, 1-184, and back cover page, dated 1996.

The Siemon Company Catalog 1997, front cover page, pp. 2-1 through 2-9, 2-18, 2-19, 14-6, and back cover page, dated 1997.

1997 Nordx/CDT catalog entitled "IBDN Catalog and Reference Guide," front cover page, pp. 5-21 through 5-29, and back cover page, Oct. 1996.

* cited by examiner

ARCUATE PATCH PANEL ASSEMBLY

BACKGROUND OF THE DISCLOSURE

1. Technical Field

The present disclosure relates to an advantageous patch panel assembly and, more particularly, to a curved or arcuate patch panel assembly that is configured to be mounted to a rack or console that facilitates cable management functions and enhances space utilization.

2. Discussion of Background Art

Patch panels are well known in the field of data communication systems. A patch panel generally provides a plurality of network ports incorporated into a single structural element that, connect incoming and outgoing lines of a local area network (LAN) or other communication, electronic or electrical system. Patch panels are usually housed within a telecommunications closet or in an alternative location appropriate for patching cables. Typical patch panels are mounted hardware units that include a plurality of port locations (e.g., twenty-four or forty-eight) that function as a sort of static switchboard, using cables to interconnect computers associated with a LAN and/or to connect computers to an outside network, e.g., for connection to the Internet or other wide area network (WAN). A patch panel generally uses a sort of jumper cable, called a patch cord, to create each interconnection.

In a typical installation, the patch panel connects a network's computers to each other and to the outside lines that enable the LAN to connect to the Internet or another WAN. Connections are generally made with patch cords and the patch panel allows circuits to be easily and efficiently arranged and rearranged by plugging and unplugging the patch cords. Patch panel systems are generally intended to facilitate organization and management in implementing telecommunications wiring systems, e.g., for high speed data networks.

Patch panels are routinely mounted between rack elements so as to permit wires or cables, e.g., unshielded twisted pair (UTP) cables, to be wired to IDCs positioned at the rear face of the patch panel, and to further permit patch plugs to be plugged into jacks or ports positioned in the front face of the patch panel. Typical patch panels are substantially planar, extending horizontally from rack element to rack element. Wires/cables are routed to the desired location at the rear of the patch panel, i.e., in the bounded region defined by spaced rack elements. Patch cords are routed to the desired jack/port on the front face of the patch panel, e.g., from a raceway or the like. Thus, for cable management purposes, the patch cords are generally drawn toward one or the other side of the patch panel at the front of the rack system and, from there, routed to the desired component and/or network communication location.

More recently, manufacturers have introduced patch panels that include a pair of planar front faces that are joined to each other at an angle, e.g., at a center-point thereof. For example, Panduit Corporation (Tinley Park, Ill.) offers a line of angled patch panels under the tradename "DP6 Plus" that includes a pair of angled panels that support a plurality of ports. With reference to FIG. 1, a top view of a commercial angled patch panel product 10 (Panduit Corporation) is provided that depicts angled panels 20, 22 joined at apex 24. Of note, flanges 26, 28 are joined to angled panels 20, 22, respectively. Flanges 26, 28 are substantially aligned with the front faces of angled panels, 20, 22 and are angularly mounted with respect thereto. Flanges 26, 28 permit patch panel product 10 to be mounted with respect to a universal rack (not pictured), e.g., a conventional 19" rack.

Similarly, commonly assigned U.S. Pat. No. 6,971,909 to Levesque, et al., the contents of which are incorporated herein by reference in their entirety, describes an angled patch panel. This angled patch panel includes first and second patch panel elements that are angularly oriented with respect to each other, with the transition from the first patch panel element to the second patch panel element achieved generally in an apex region. The angled patch panel also includes flange members that extend from the first and second patch panel elements. Each of the flange members define a mounting face and an extension arm that is intermediate the mounting face and the patch panel element. Of particular note, the extension arm is dimensioned to facilitate at least partial recessing of the angled patch panel relative to the rack/console when the angled patch panel is mounted thereto.

Despite efforts to date, a need remains for improved patch panel designs that are configured to be mounted to a rack or console, facilitate cable management functions, enhance space utilization at and around the rack/patch panel assembly, and provide desirable appearance with enhanced utility and functionality.

SUMMARY OF THE DISCLOSURE

The present disclosure is directed to a curved or arcuate patch panel that is configured to be mounted to a rack or console, facilitates cable management functions, and enhances space utilization at and around the rack/patch panel assembly. The curved or arcuate patch panel of the present disclosure is configured for mounting to a rack or console and includes a patch panel element and flange members. The flange members are formed and/or positioned at each end of the patch panel element. Each of the flange members define a mounting face that includes mounting features for facilitating mounting of the arcuate patch panel relative to a rack or console. Such mounting features typically take the form of slots and/or apertures, although alternative mounting features may be employed. Optionally, each flange element also advantageously includes or defines an extension arm that is intermediate the mounting face and the patch panel element to which the flange element is mounted or from which the flange element extends. The extension arm is dimensioned to facilitate at least partial recessing of the arcuate patch panel relative to the rack/console when the arcuate patch panel is mounted thereto.

In an exemplary embodiment of the present disclosure, the flange elements are integrally formed with respect to the patch panel element. The peak region of the arcuate patch panel may be defined by forming an appropriate bend radius (or combination of radii) in an elongated member so as to define the desired arcuate dimensions thereof. Moreover, the flange members may be defined by forming appropriate bends in the elongated structural element. Thus, with respect to each flange member, a first bend may be formed to define a mounting face. Optionally, a first bend may be formed to define the extension arm, and a second bend may be formed to define the mounting face. In exemplary embodiments of the present disclosure, the extension arm is substantially perpendicular relative to the mounting face, whereas the extension arm and the associated front face of the patch panel element typically define an acute angle.

The disclosed curved or arcuate patch panel typically includes a plurality of modular jacks or ports in the front face that are adapted to receive plugs and associated punch down blocks at the rear of the arcuate patch panel. The number of ports associated with the disclosed arcuate patch panel may vary. Exemplary designs of the disclosed patch panel include twenty-four ports. In such embodiments, the ports are typically arranged in groups of six, with two (or four) sets of six ports mounted with respect to each arcuate patch panel element, thus 48 and 64 port panels are envisioned, and others are possible.

Accessory elements may be advantageously provided according to exemplary implementations of the disclosed arcuate patch panel. Thus, for example, a wire management bracket may be mounted with respect to rearwardly directed threaded studs associated with the respective patch panel elements. The wire management bracket may facilitate cable routing at the rear of the arcuate patch panel, i.e., within the rack or console. Cable ties may be employed to enhance cable management performance. In addition, mounting screws and lock washers may be provided to facilitate mounting of the arcuate patch panel with respect to a rack/console. In circumstances where grounding is desired, an appropriate lock washer may be selected, e.g., a lock washer fabricated from phosphorous bronze. Distinct regions for labeling of the ports that are accessible at the front face of the arcuate patch panel may also be provided, as will be apparent to persons skilled in the art. Cable manager(s) may be mounted to the front face of one or both patch panel elements to further facilitate cable management functions associated with the disclosed arcuate patch panel assembly.

In use, the curved or arcuate patch panel of the present disclosure facilitates cable management functions, while enhancing space utilization at and around the rack/patch panel assembly. Curving of the patch panel elements facilitates cable routing to the sides of the rack/console. The advantageous design of the disclosed flange members and the enhanced functionalities that result from the design of such flange members permit the patch panel elements to be substantially recessed relative to a rack/console. By recessing the patch panel elements relative to a rack/console, several advantages are realized: (i) reduced likelihood that debris or other undesirable elements will enter the region behind the patch, (ii) enhanced cable management functionality within the rack/console by positioning such activities more effectively within the interior of the rack/console, (iii) reduced region in front of the rack that is effected by cable management functionalities, and (iv) a cleaner, more uniform appearance is provided for patch panel/rack assemblies.

Additional advantageous features and functions associated with the disclosed curved or arcuate patch panel and patch panel assembly will be readily apparent from the detailed description which follows, particularly when reviewed together with the drawings appended hereto.

BRIEF DESCRIPTION OF THE FIGURES

So that those having skill in the art to which the subject matter of the present disclosure appertains will have a better understanding of uses and implementations of the disclosed arcuate patch panel and arcuate patch panel assemblies, reference is made to the accompanying figures wherein.

DETAILED DESCRIPTION OF EXEMPLARY EMBODIMENT(S)

Figure 1:
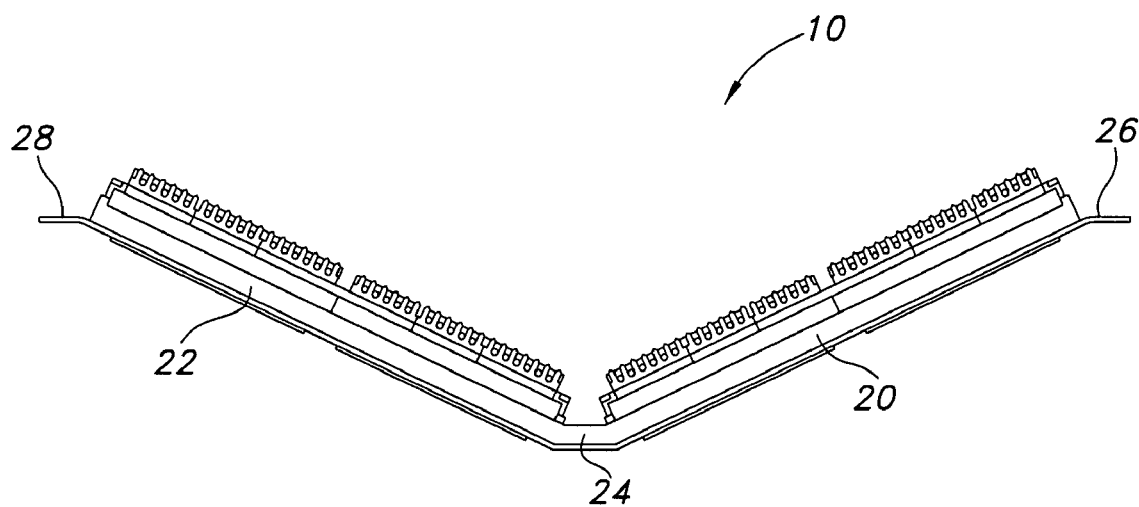
FIG. 1 is a top view of a prior art angled patch panel.

The present disclosure provides advantageous curved or arcuate patch panels that are configured to be mounted to a rack or console, to facilitate cable management functions, and to enhance space utilization at and around the rack/patch panel assembly. The curved or arcuate patch panels of the present disclosure may be dimensioned to function in cooperation with conventional rack/console structures, e.g., 19" and 23" racks. A plurality of the disclosed curved or arcuate patch panels may be mounted with respect to a single rack/console, as will be readily apparent to persons skilled in the art.

With reference to FIGS. 2, 3A-C and 4A-C, an exemplary curved or arcuate patch panel 100 according to the present disclosure is schematically depicted. Patch panel 100 is configured for mounting to a conventional 19" rack (partially shown as 50a and 50b). Patch panel 100 includes a curved or arcuate patch panel element 102. The patch panel element 102 is preferably configured such that the maximum deflection or peak region 106 is generally defined at or near the midpoint of the patch panel element 102 and the patch panel 100. It will be appreciated that the curved or arcuate patch panel is described herein as arcuate for the purposes of illustration and simplicity. However, such description should not be considered limiting. The curved or arcuate patch panel assembly could be arcuate, sectionally arcuate, multi-sectioned arcuate, parabolic, and the like, as well as combinations including at least one of the foregoing as desired to satisfy any functional and aesthetic requirements.

According to an exemplary embodiment of the present disclosure, patch panel element 102 is formed, at least in part, by a single structural element, e.g., an elongated member that is fabricated from a sufficiently rigid material, e.g., aluminum, steel, plastic, and the like. In the illustrated embodiment of FIGS. 2-4, patch panel element 102 is defined by an elongated aluminum member shown generally as 103 that includes a plurality of cut-outs 104 to facilitate receipt/mounting of six-port modules. Thus, with reference to FIGS. 4 A-C, patch panel element 102 further includes four (4) modules 108a, 108b, 108c, 108d, each of which includes six (6) linearly aligned ports accessible from the front of arcuate patch panel 100. In total, exemplary patch panel 100 includes twenty-four (24) ports/jacks. The jacks associated with the jack modules of the present disclosure may be of conventional design with appropriate levels of performance, e.g., CAT 5E and/or CAT 6 performance levels.

Jack modules (e.g., jack modules 108a-108d) typically include a substantially rectangular projection face that defines, at least in part, the six linearly aligned jack openings associated with the module 108a-108d. The plurality of substantially rectangular cut-outs 104 are dimensioned and configured to receive the projection faces associated with the jack modules 108a-108d. The jack modules 108a-108d also typically include a housing portion that is of larger dimension than the rectangular projection face, thereby allowing the module to be securely positioned relative to elongated aluminum member 103, e.g., when introduced from the rear thereof. Mounting elements are typically provided at the rear of the patch panel 100 to secure the jack modules relative to the elongated aluminum member 103.

Thus, exemplary jack modules, e.g., 108a-108d according to the present disclosure include projection faces that extend through substantially rectangular openings, e.g., 104 formed in the patch panel element 102, and such jack modules are secured in place by mounting brackets positioned at the rear of the patch panel 100. Of note, the rectangular opening(s) closest to peak region 106 are advantageously spaced away from the center point of the disclosed arcuate patch panel by a sufficient distance to ensure that inner-most wires secured to the rearwardly directed insulation displacement connectors (IDCs) have an appropriate/acceptable bend radius.

In an exemplary embodiment of the present disclosure, threaded studs 145 are perpendicularly mounted with respect to patch panel element 102, e.g., on either side of each rectangular cut-out, and are adapted to cooperate with one or more apertures formed at the edges of the jack modules 108a-108d. The threaded studs 145 may be advantageously secured to the rear of the elongated member 103, e.g., by countersinking the screw head into an appropriately sized recess, welding, adhering or the like. Mounting brackets are typically fabricated from an appropriate metal or plastic material and may be positioned in an interference position with respect to the jack modules 108a-108d in the assembly process. The mounting brackets are generally secured in place by threading nuts 148 onto the upstanding studs that project from the rear of the patch panel element 102, although alternative securement methods may be employed, as will be apparent to persons skilled in the art. Exemplary mounting brackets 120, 122, 124, 126, 128, and 129 are depicted in the exemplary embodiment depicted in FIG. 6. Of note, the centrally positioned mounting brackets (e.g., brackets 122, 128 in FIG. 6) may include downwardly extending walls and/or block structure(s) (not pictured) that are configured and dimensioned to space and align adjacent jack modules, e.g., 108a-108d.

In an exemplary embodiment, the elongated member 103 that defines (at least in part) the patch panel element 102 generally forms at least one arc segment. The bend radius is selected based on the desired geometry of the patch panel 100, but typically ranges between about twenty (20) inches and about thirty (30) inches. Once again, it will be appreciated that while the patch panel element 102 is described herein as being arcuate, it may be formed employing a variety of curves including, but not limited to arcuate, sectionally arcuate, multi-sectioned arcuate, parabolic, and the like, including combinations including at least one of the forgoing. In one embodiment a bend radius of about twenty-five (25) inches is employed. Of note, the bend radius/radii patch panel element 102 is generally selected so as to facilitate access to the center-most connector locations at the rear of the arcuate patch panel 100, e.g., using a conventional punch-down tool.

According to an exemplary embodiment of the present disclosure, the elongated member includes a further "rearward" bend at the base thereof, such rearward bend defining an elongated shelf 107 that extends substantially from side-to-side relative to the patch panel element 102. To accommodate the bend(s) of the elongated member 103, preferably, the elongated shelf 107 is formed with controlled tooling and fixtures, however, if necessary, one or more cut(s) may be made in the shelf 107 along its length and an appropriate amount of material removed from the elongated element 103. Thereafter, to facilitate maintaining the elongated member 103 at the desired radius/radii, one or more welds may be made to connect the shelf 107. In those embodiments of the disclosed arcuate patch panel 100 that include a shelf, the shelf generally enhances the stability/structural integrity of the disclosed arcuate patch panels and supplies a base to the patch panel 100, e.g., prior to mounting arcuate the patch panel relative to a rack/console.

With further reference to FIGS. 2, 3A-C, and 4A-C, patch panel 100 includes flange members 110 that extend from patch panel element 102. According to the present disclosure, flange members 110, are formed and/or positioned at each end of patch panel 100. Each of the flange members 110 define a mounting face that includes mounting features for facilitating mounting of the arcuate patch panel 100 relative to a rack or console (not shown). Such mounting features typically take the form of slots and/or apertures, although alternative mounting features may be employed. In another exemplary embodiment, each flange member now referred to by reference numeral 110a also advantageously includes or defines an extension arm 112 that is intermediate the mounting face and the patch panel element 102 to which the flange element 110a is mounted or from which the flange element 110a extends. The extension arm 112 is dimensioned to facilitate at least partial recessing of the patch panel 100 relative to the rack/console when the patch panel 100 is mounted thereto.

Figure 3A:
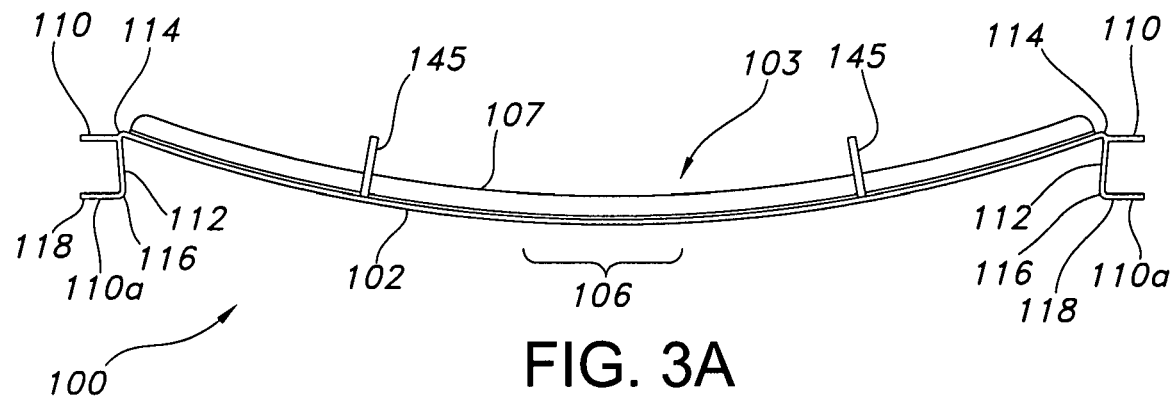
FIG. 3A is a top view of part of an exemplary patch panel.
Figure 3B:
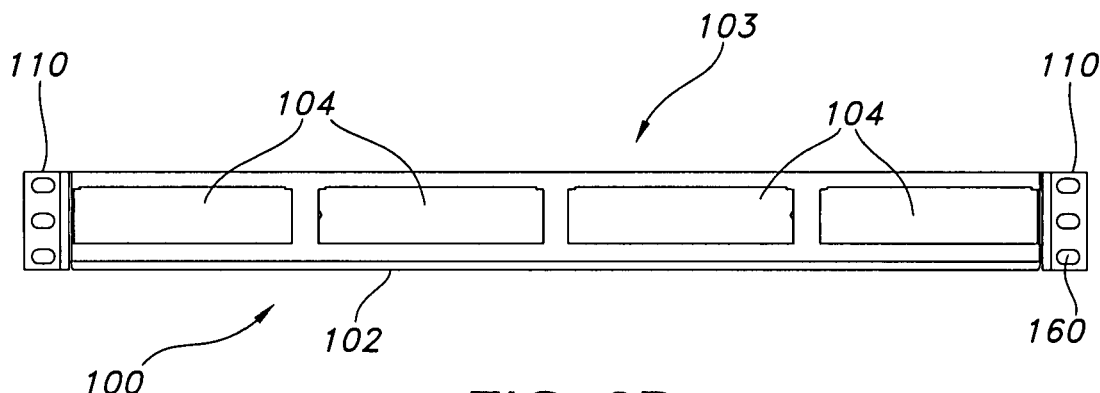
FIG. 3B is a front view of the exemplary patch panel part of FIG. 3A.
Figure 3C:
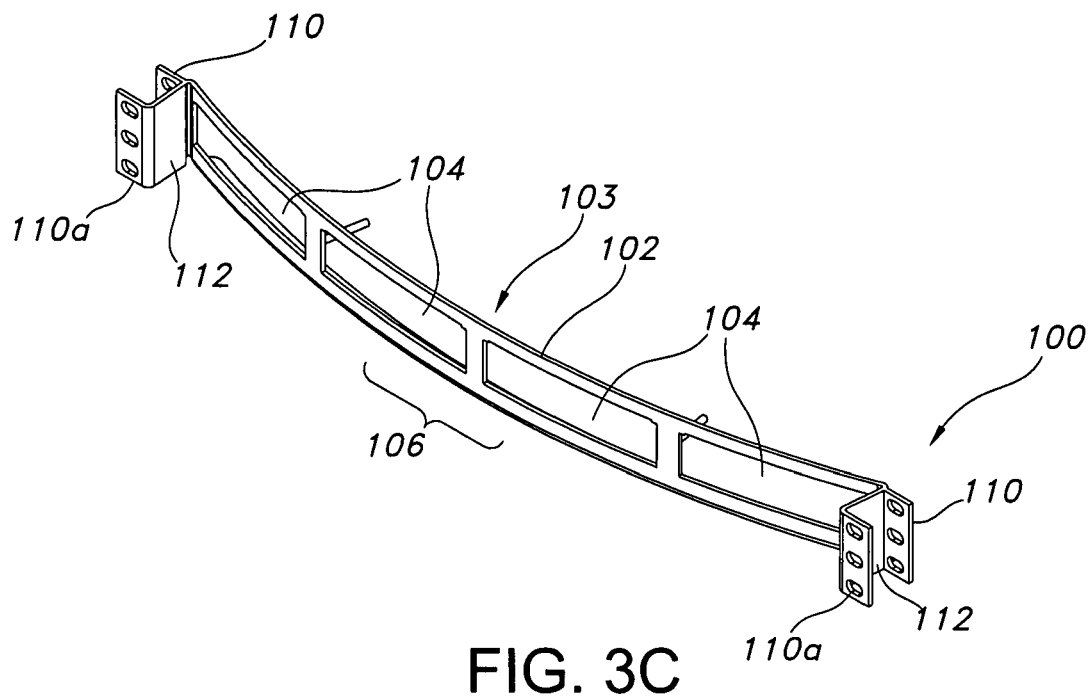
FIG. 3C is a top perspective view of the exemplary patch panel part of FIG. 3A.
Figure 4A:
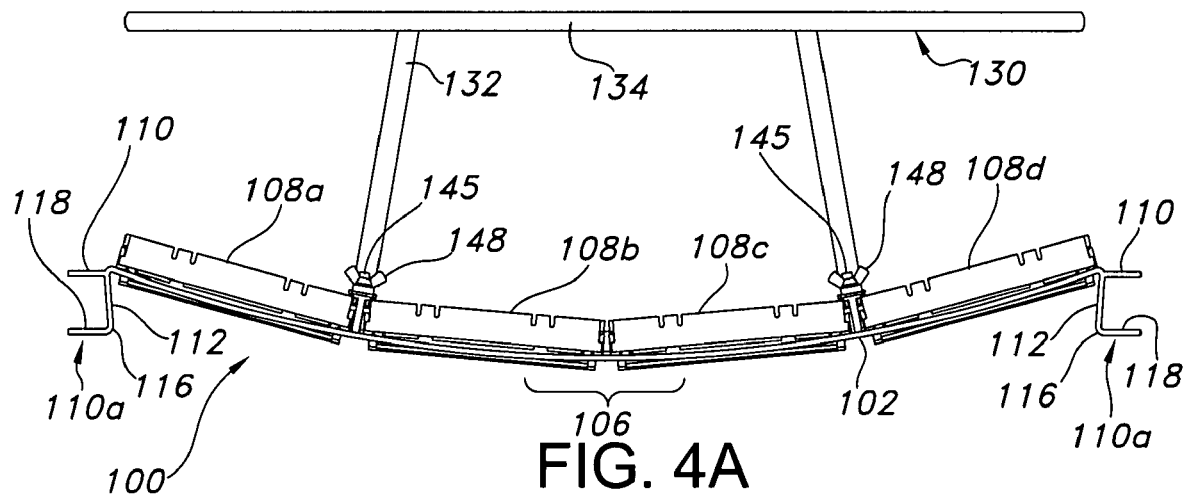
FIG. 4A is a top view of an exemplary patch panel.
Figure 4B:
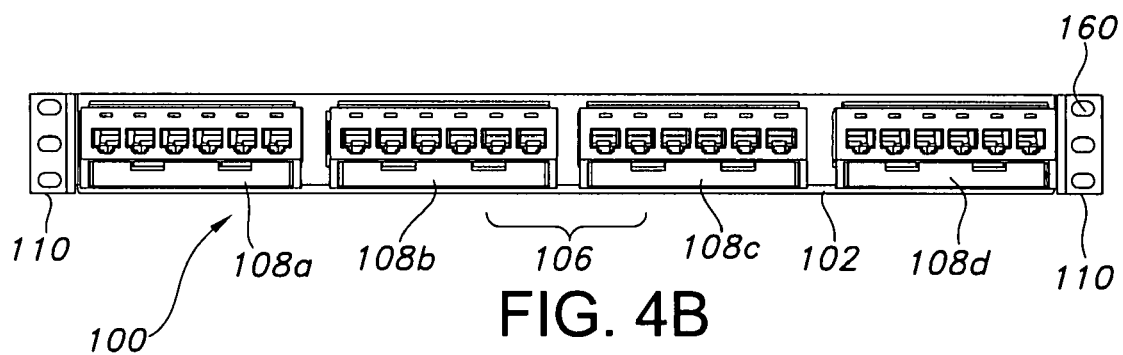
FIG. 4B is a front view of the exemplary patch panel of FIG. 4A.
Figure 4C:
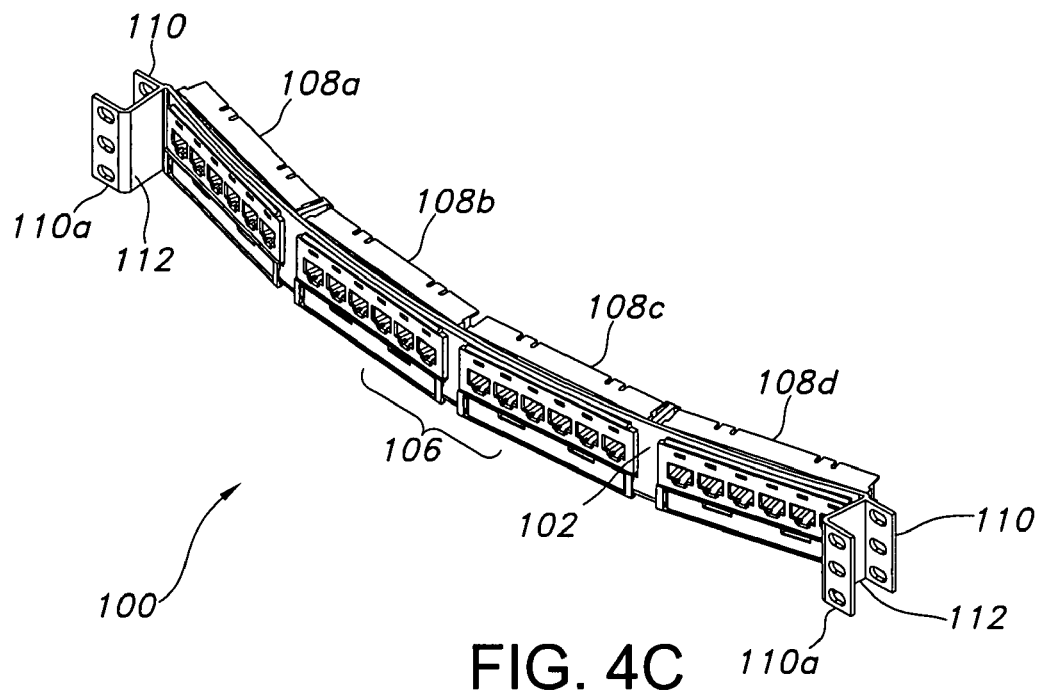
FIG. 4C is a top perspective view of the exemplary patch panel of FIG. 4A.

Thus, as shown in FIGS. 3A and 4A, flange members 110, 110a are advantageously defined by forming appropriate bends in the elongated member 103 that defines (at least in part) the patch panel element 102. With particular reference to flange member 110, a first bend 114 may be formed to define the mounting face 118. As shown in FIGS. 3A-C and 4A-C, the mounting face 118 is substantially parallel to the peak region 106 and mounting rack (not shown) to facilitate mounting and installation of the arcuate patch panel 100. With particular reference to flange member 110a, a first bend 114 may be formed to define the extension arm 112, and a second bend 116 may be formed to define the mounting face 118. As shown in the figures, the extension arm 112 is substantially perpendicular to the mounting face 118, whereas the extension arm 112 and the associated front face of the patch panel element 102 typically define an acute angle, e.g., about 60° to 80° depending on the bend radius employed for the patch panel element 102.

The presence of extension arm(s) 112 as part of flange members 110a advantageously permits the patch panel element 102 to be substantially recessed relative to rack elements 50a, 50b. (See FIG. 2) Thus, in an exemplary embodiment of the present disclosure, the height of the arcuate portion of the patch panels element 102 is between about one-half (0.5) and two and one-half (2.5) inches, generally approximately 1.5 inches (1.5") and the extension arms 112 are approximately one inch (1") in length. In such embodiment, the peak region 106 of the patch panel 100 extends approximately ½ inch beyond the plane defined by mounting faces 118 of flange member 110a. Thus, the patch panel element 102 is substantially recessed within the rack/console to which it is mounted. Refinements and/or adjustments in the degree to which the patch panels are recessed relative to the rack/console may be effected by adjusting the arc height relationship of the patch panel element 102 and/or by adjusting the lengths of the extension arms 112 of flange members 110a. For example, the extension arms 112 associated with flange members 110a may advantageously range in dimension from about 0.5 to about 1.5 inches and more advantageously from about 0.75 inches to about 1.25 inches. Regardless of the precise geometric arrangement, however, the extension arms 112 that are formed in the disclosed flange members 110a advantageously facilitate recessing of the patch panel members 102 to a desired degree relative to a rack/console.

Figure 5:
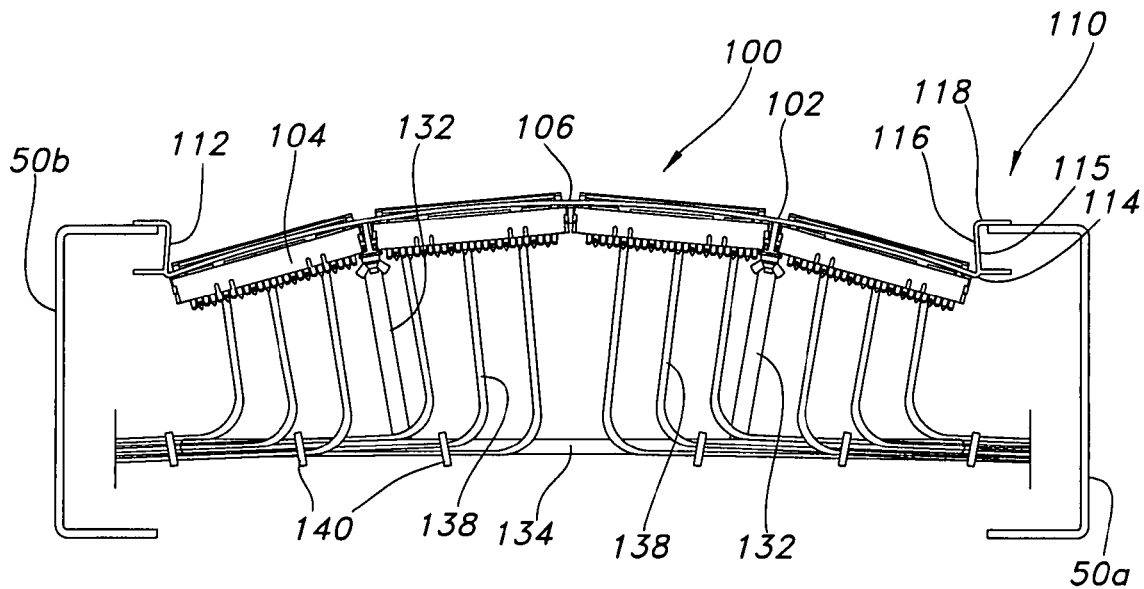
FIG. 5 is a top schematic view of an exemplary patch panel assembly with wires/cables mounted to the rear thereof.
Figure 6:
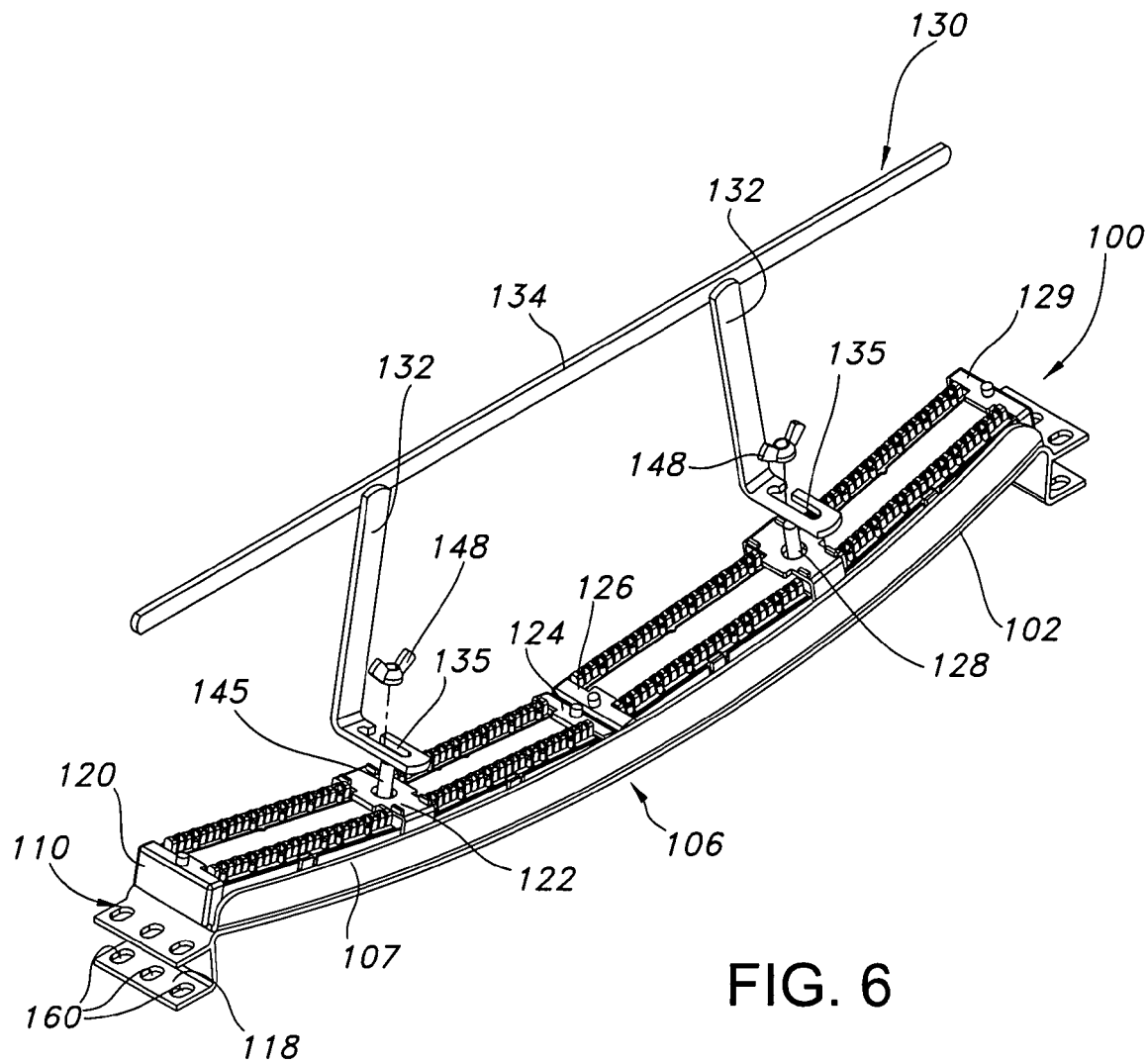
FIG. 6 is a bottom perspective view, partially exploded, of a further exemplary patch panel and wire management bracket according to the present disclosure.

Turning now to FIGS. 5 and 6, accessory elements may be advantageously mounted with respect to patch panel 100, e.g., to facilitate cable management functions associated therewith. Thus, for example, one or more wire management brackets 130 may be mounted to the rear of the patch panel 102. An exemplary wire management bracket 130 includes a pair of L-shaped arms 132 and an elongated bar 134. The L-shaped arms 132 include a slot (see FIG. 6) to facilitate mounting of wire management bracket 130 relative to patch panel 100. Thus, in an exemplary embodiment of the present disclosure, the centrally positioned studs 145 that are used, at least in part, to position mounting brackets (e.g., brackets 122, 128 in FIG. 6) relative to jack modules 108a-d, may also be employed to secure cable management bracket 130 relative to patch panel 100. In such embodiment, wing nuts 148 may be provided to secure the cable management bracket relative to the threaded studs 145, although alternative mounting mechanisms may be employed without departing from the present disclosure.

As shown in FIG. 5, wires/cables 138 are mounted to the rear of jack modules 108a-d associated with the patch panel element 102 and are routed rearwardly toward elongated bar 134 of wire management bracket 130. The wires/cables 138 are bent outwardly along elongated bar 134 and are secured relative to elongated bar 134 by wire ties 140. Once routed to the side (left or right), the wires/cables may be advantageously routed to a desired location, as is well known in the art. Generally, it is desired to maintain the minimum cable bend radius to four times the outside cable diameter.

As clearly shown in FIG. 6, L-shaped arms 132 include slots 135 that receive threaded studs 145. According to an exemplary embodiment of the present disclosure, slots 135 permit the wire management to be undertaken with the stud positioned in the slot at the furthest distance from the extended arm portion of the L-shaped arm, and then slid to the opposite end of the slot once wire management is complete. This repositioning permits efficient wire management activities. Once the wire management bracket 130 is in the desired location relative to patch panel 100, wing nuts 148 are tightened onto studs 145, thereby securing wire management bracket 130 relative to arcuate patch panel 100. The L-shaped arms 132 are angularly oriented relative to elongated bar 134, thereby accommodating the arcuate orientation of the patch panel element 102 and contributing greater stability to wire management bracket 130. As noted, wing nuts 148 may be used to secure the cable management bracket 130 relative to the threaded studs 145, although alternative mounting mechanisms may be employed without departing from the present disclosure.

Figure 2:
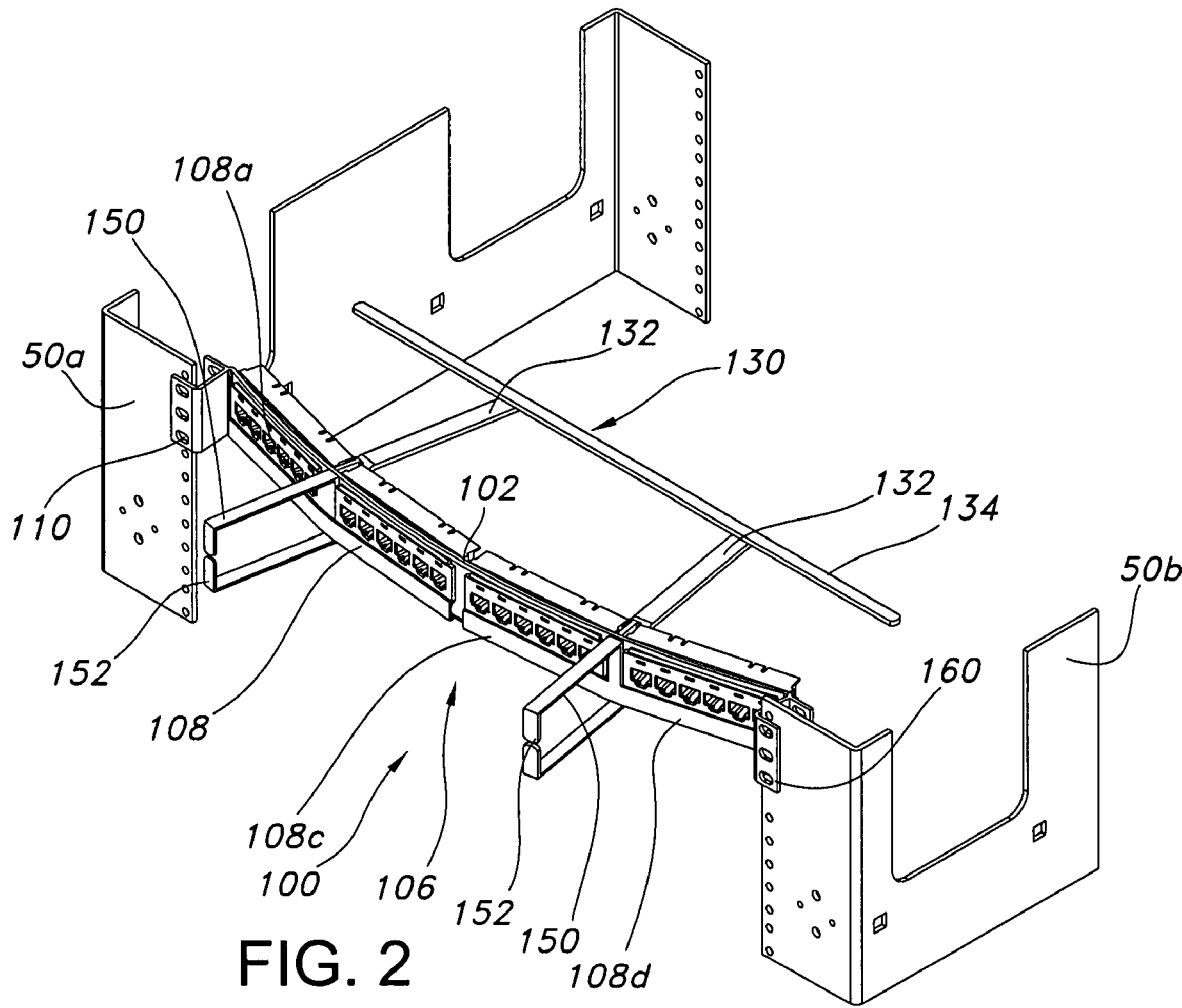
FIG. 2 is a perspective schematic view, partially cut-away, showing an exemplary patch panel assembly with accessory elements according to the present disclosure.
Figure 7:
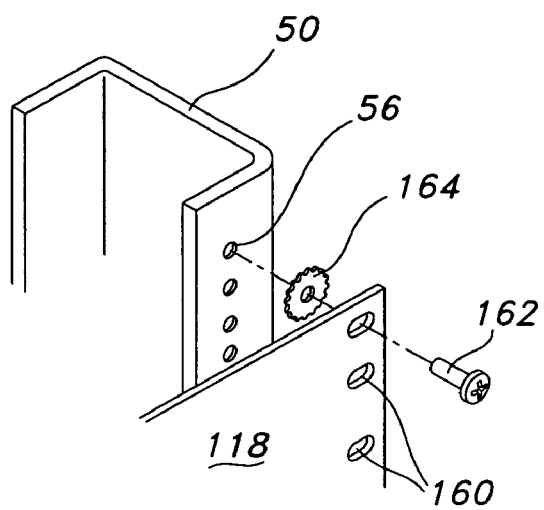
FIG. 7 is a top perspective view, exploded and partially cut-away, showing an exemplary patch panel being mounted with respect to a rack assembly, according to the present disclosure.

As also shown in FIGS. 2 and 7, each mounting face 118 of flange member 110, 110a includes three (3) apertures 160 to facilitate mounting of patch panel 100 (24 port in this illustration) relative to a rack/console, e.g., 50a/50b. The number of apertures 160 and arrangement thereof on the mounting face 118 of the flange members 110, 110a is not critical to the present disclosure, although it is generally desirable that the mounting feature cooperate with the features generally found on conventional racks, consoles and the like. Thus, the spacing of the mounting features, e.g., apertures, is generally selected to correspond to applicable industry standards.

In an exemplary embodiment, mounting face 118 includes a plurality of apertures 160. The flange member 110, 110a is preferably mounted with respect to a rack 50 by passing a screw 162 through aperture 160, lock washer 164 and into engagement with a mounting aperture 56 formed in rack 50. In circumstances where grounding is desired, an appropriate lock washer 164 may be selected, e.g., a lock washer fabricated from phosphorous bronze. Multiple screws 162 and lock washers 164 may be employed, as will be readily apparent to persons skilled in the art. Once mounted to a rack/console, the arcuate patch panel and the rack/console together define an arcuate patch panel assembly.

With further reference to FIG. 2, one or more cable manager(s) 150 may be advantageously mounted to the front face of the patch panel element 102, e.g., between aligned jack modules. Cable manager(s) 150 are substantially rectangular in configuration and include a mounting feature, e.g., an aperture, slot or threaded screw, that facilitates mounting relative to the front face of patch panel element 102. A gap 152 is defined in the region opposite the mounting feature to facilitate introduction/withdrawal of wires/cables therefrom.

Figure 8:
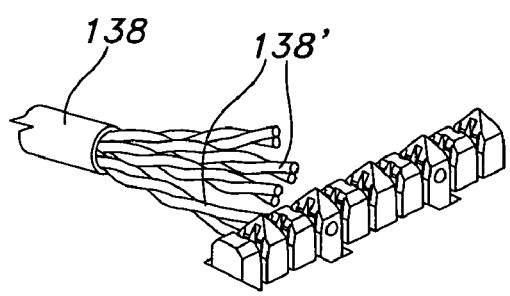
FIG. 8 is a schematic view of a multi-wire cable being mounted with respect to IDCs that extend from the rear of a patch panel according to an exemplary embodiment of the present disclosure.

With reference to FIG. 8, a schematic depiction of the interaction between individual wires 138' from wire/cable 138 and jack module 108a is provided. As is well known in the art, IDCs are positioned within a housing associated with the jack module, and separated wires 138' are inserted into an appropriate junction according to applicable wiring standards. Pair twists are generally maintained to within ½ inch of the point of termination for enhanced data performance. Typically, cables are routed and terminated starting from the outside of the disclosed arcuate patch panel and working toward the center. Cables are typically routed from both sides of the rack, rather than from only one, to achieve optimal cable management functionality.

Exemplary embodiments of the present disclosure include indicia, e.g., port designations and the like are depicted on the front face of the patch panel assembly 100. (see, e.g., FIG. 9). The indicia may be printed, etched, painted, label, an appliqué, and the like, as well as combinations including at least one of the foregoing. In an exemplary embodiment, the indicia are provided via an appliqué that is adhered to the front face of the patch panel element 102. The appliqué generally includes pre-printed indicia, e.g., port designations and the like (see, e.g., FIG. 9). Advantageously, use of appliqué(s) on the front face of the patch panel element 102 facilitates manufacture and use of the disclosed patch panel(s) 100. Inclusion of appropriate indicia on such appliqué(s) facilitates the interconnections that users desire to effect, while minimizing or avoiding the expense and difficulty of printing or otherwise defining appropriate indicia directly on the patch panel element. The appliqué(s) are typically fabricated with appropriate rectangular openings (to match up with the openings formed in the patch panel element 102) and advantageously extend substantially from side-to-side. Regions for mounting/adhering additional label-like information may also be provided according to the present disclosure, e.g., below the linearly aligned ports (see, e.g., label blocks 420 in FIG. 9).

Figure 9:
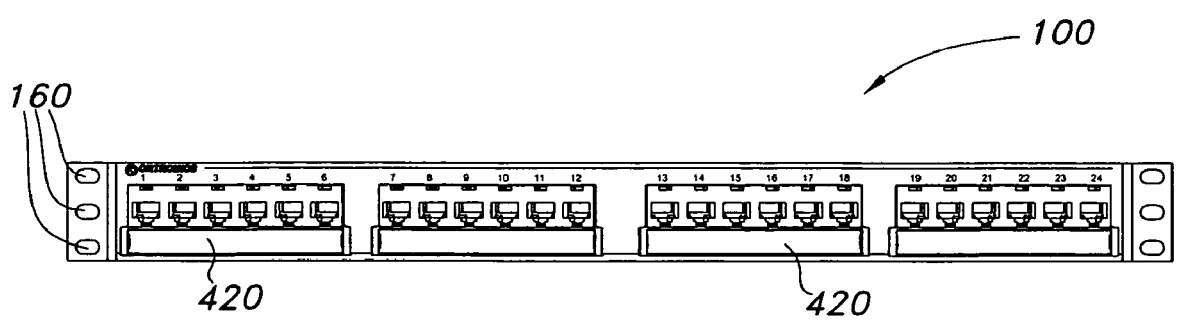
FIG. 9 is a front view of a twenty four (24) port patch panel according to an exemplary embodiment of the present disclosure.
Figure 1:
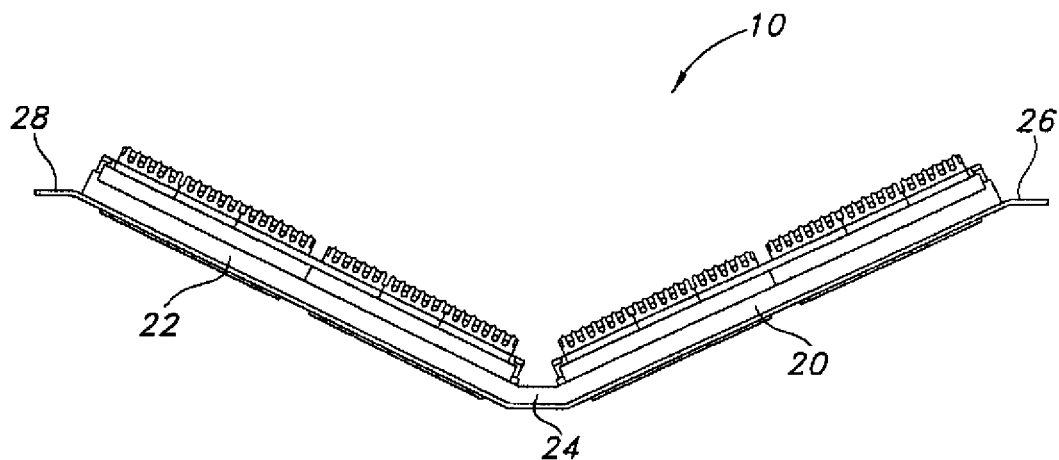
Figure 2:
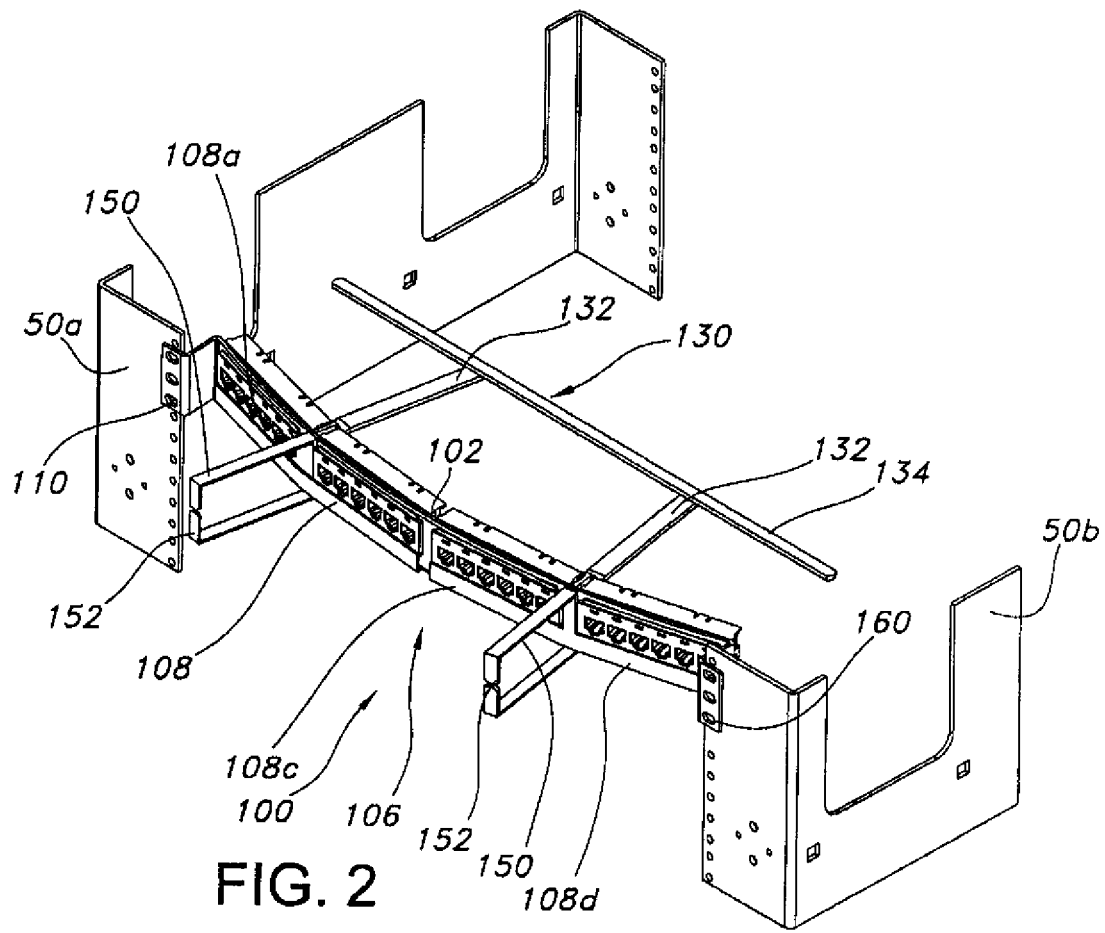
Figure 3A:
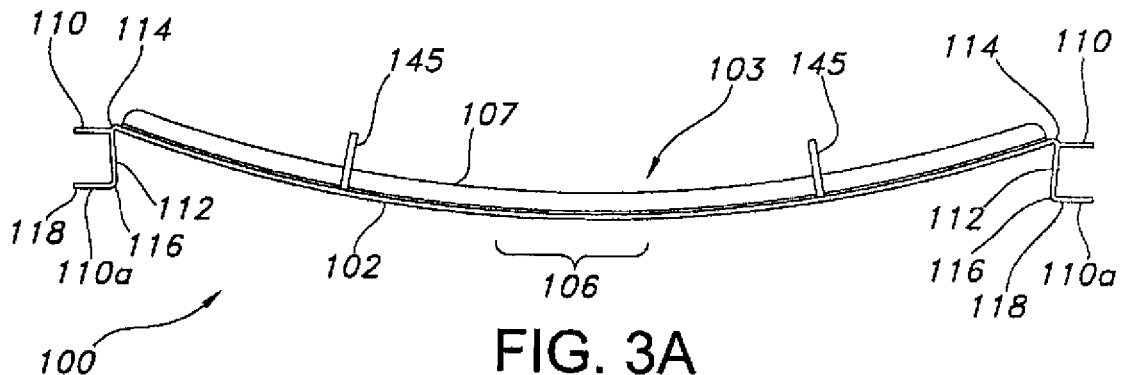
Figure 3B:
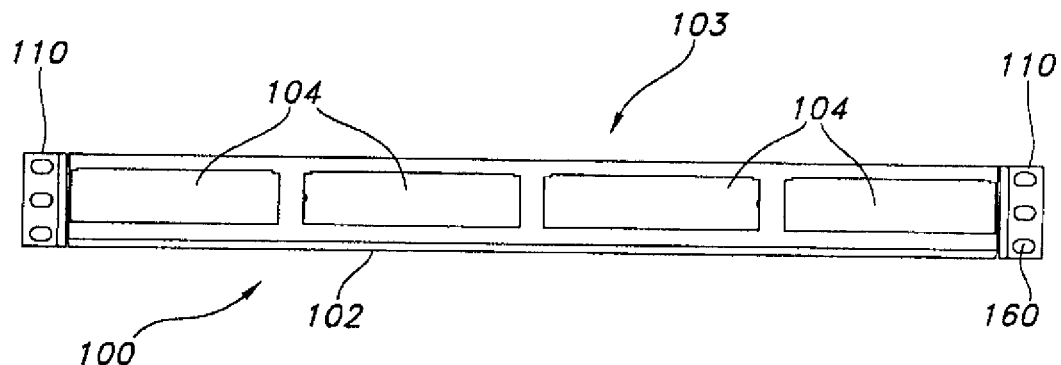
Figure 3C:
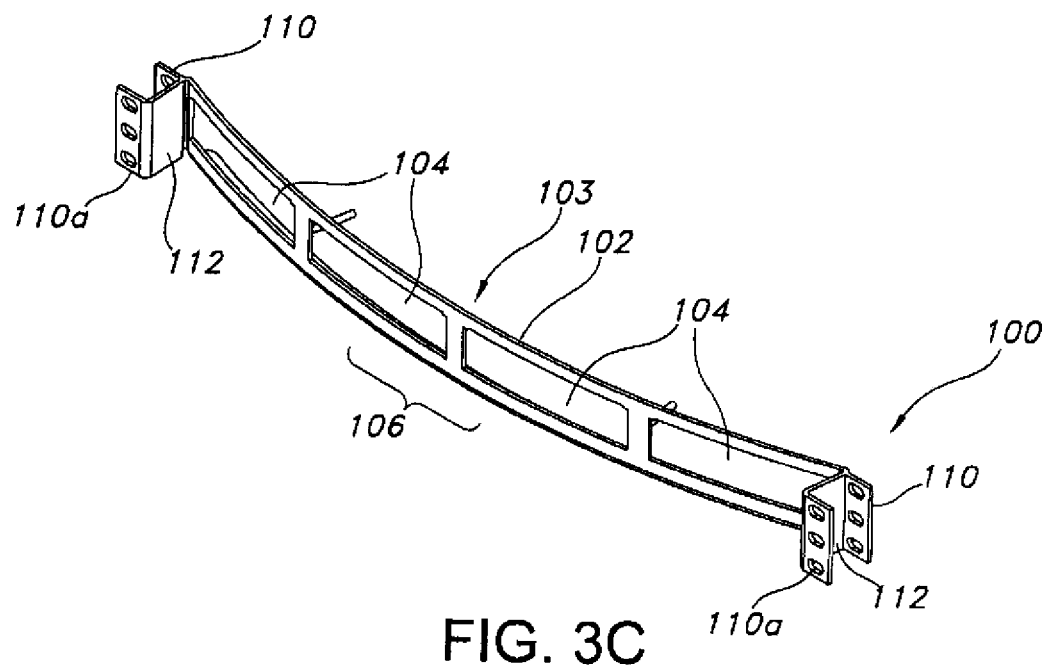
Figure 4A:
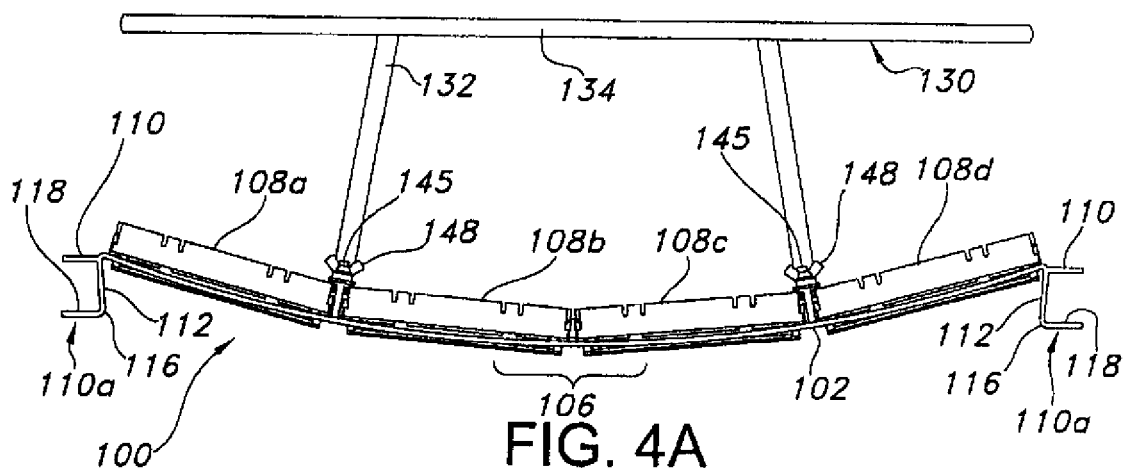
Figure 4B:
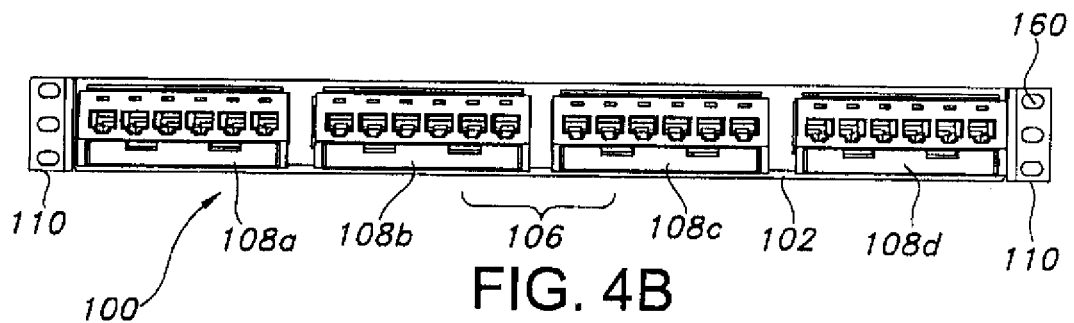
Figure 4C:
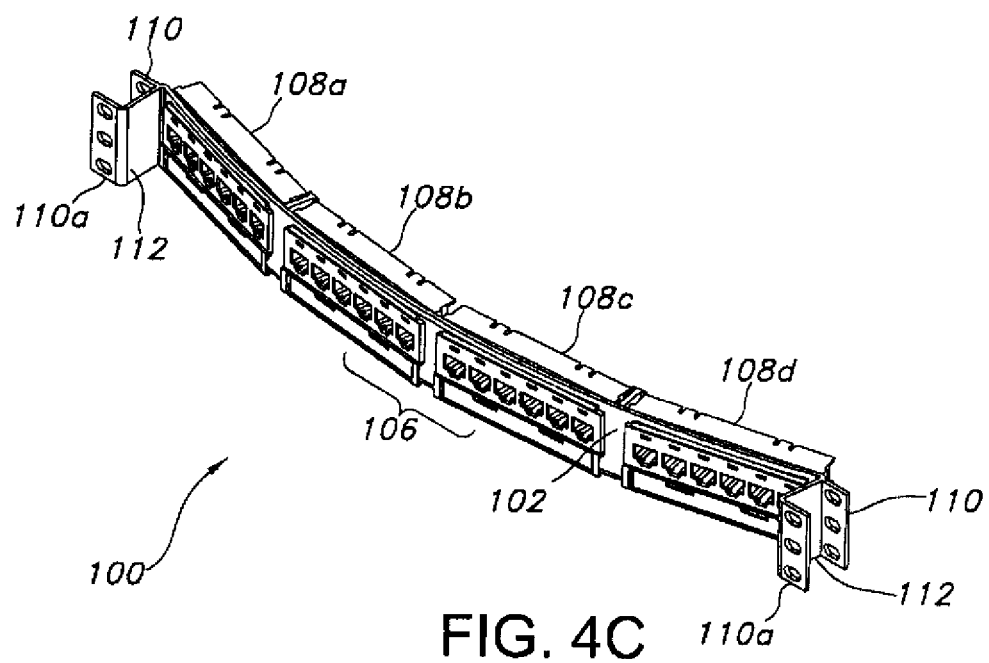
Figure 5:
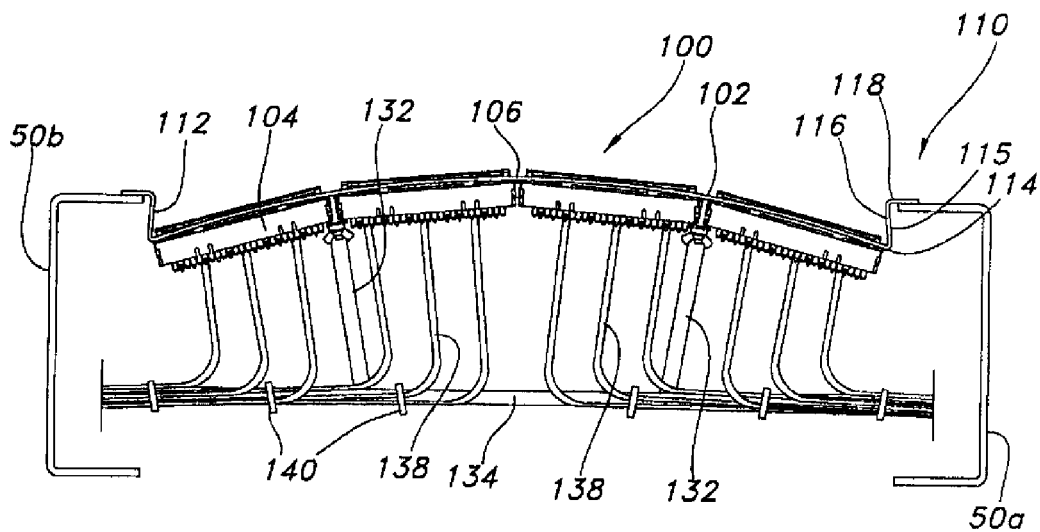
Figure 6:
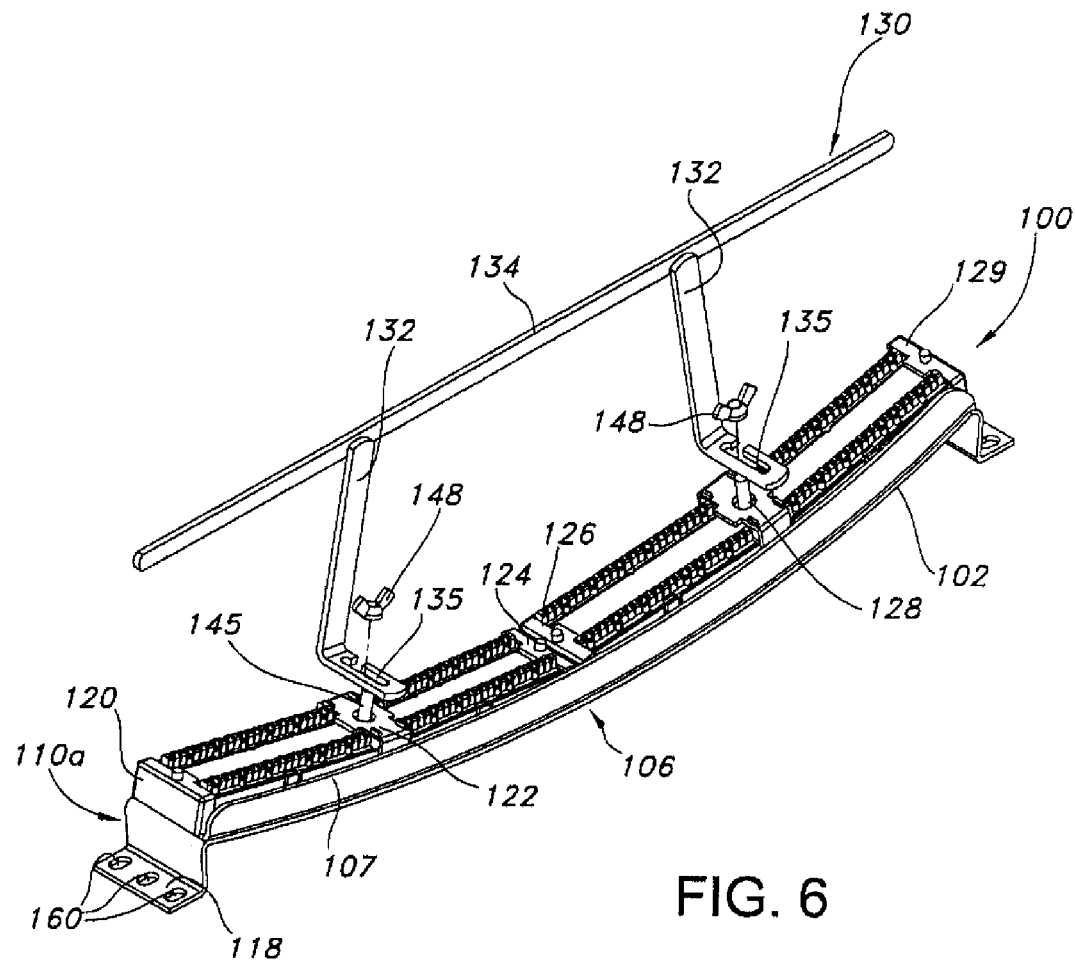
Figure 7:
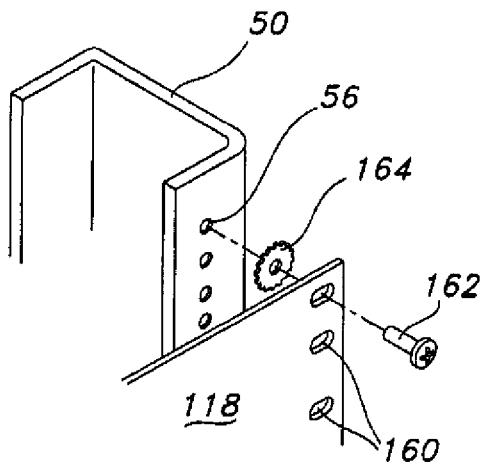
Figure 8:
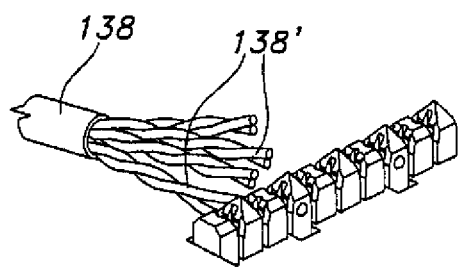
Figure 9:
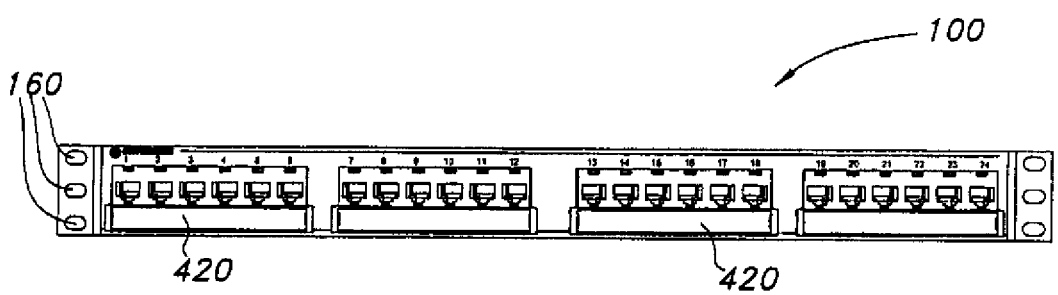

With reference to FIG. 9, front views of patch panel 100 are schematically depicted. The ports are advantageously numbered from 1-24 from left-to-right. Such numbering is typically accomplished with an appliqué, as described above. Label blocks are also provided for mounting/adhering additional label-like information below the linearly aligned ports.

It will be readily appreciated that while a patch panel 100, according to the present disclosure, is schematically depicted as including 4 six-port modules, e.g., 108*a-d*, one skilled in the art may readily envision other configurations. For example, in another embodiment the structure of the arcuate patch panel is substantially identical to the structure of patch panel 100, except that it may include forty-eight (48) ports rather than twenty-four (24) ports. Thus, in this embodiment the overall height of the patch panel 100 is approximately twice that of patch panel 100. In exemplary embodiments of the present disclosure, patch panel 100 (which includes 24 ports) is typically about 1.75 inches in height, i.e., about one rack mount unit (RMU), while a patch panel which includes 48 ports is typically about 3.5 inches in height, i.e., about two (RMUs).

In use, the arcuate patch panels of the present disclosure facilitate cable management functions, while enhancing space utilization at and around the rack/patch panel assembly. The curved structure of the patch panel elements facilitates cable routing to the sides of the rack/console. The advantageous design of the disclosed flange members and the enhanced functionalities that result from the design of such flange members permit the patch panel elements to be substantially recessed relative to a rack/console. By recessing the patch panel elements relative to a rack/console, several advantages are realized: (i) reduced likelihood that debris or other undesirable elements will enter the region behind the patch, (ii) enhanced cable management functionality within the rack/console by positioning such activities more effectively within the interior of the rack/console, (iii) reduced region in front of the rack that is effected by cable management functionalities, and (iv) a cleaner, more uniform appearance is provided for patch panel/rack assemblies.

Although the curved patch panels and curved patch panel assemblies of the present disclosure have been described with reference to exemplary embodiments thereof, the present disclosure is not limited to such exemplary embodiments. Rather, the present disclosure extends to and encompasses such modifications and/or enhancements that will be apparent to persons skilled in the art in view of the detailed description provided herein.

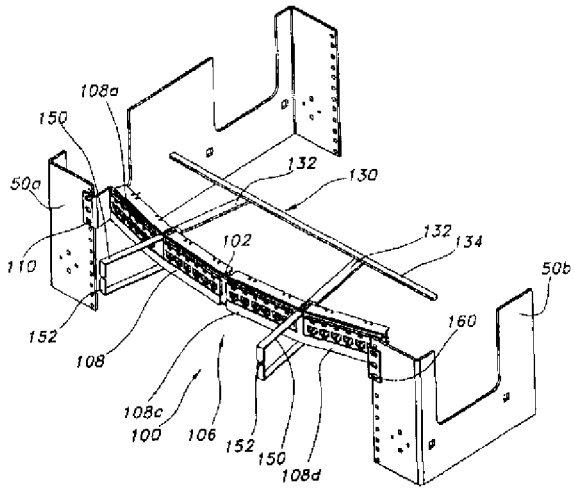

The invention claimed is:

1. A curved patch panel comprising:
   (a) an elongated patch panel element, said elongated patch panel element defining respective first and second ends, having a length extent extending from said first end to said second end, and exhibiting a peak region disposed along said length extent between said first end and said second end, said length extent being predominantly curved, including wherein said length extent includes at least one curved portion configured and dimensioned to receive a jack module for mounting with respect to said elongated patch panel element; and
   (b) first and second flange members, each of said first and second flange members extending from a respective one of said first end and said second end of said elongated patch panel element, each of said first and second flange members further including a mounting face, each said mounting face being oriented substantially parallel to said peak region, and configured for mounting said curved patch panel to a rack.

2. A curved patch panel according to claim 1, further including first and second extension arms, each of said first and second extension arms being operably connected between a respective one of said first end and said second end of said elongated patch panel element and a respective one of said first flange member and said second flange member, and facilitating said elongated patch panel element being substantially recessed relative to said rack.

3. A curved patch panel according to claim 1, wherein said elongated patch panel element is formed from a single elongated element.

4. A curved patch panel according to claim 3, wherein said single elongated element is an elongated aluminum member.

5. A curved patch panel according to claim 1, wherein said length extent includes a first curved portion defining a curved mounting face and an opening formed in the curved mounting face, the opening being configured and dimensioned to receive a jack module.

6. A curved patch panel according to claim 5, further comprising a jack module positioned in the opening, wherein said jack module defines a planar front face and is retained in position with respect to said curved mounting face by a mounting bracket.

7. A curved patch panel according to claim 5, wherein said jack module includes six linearly aligned ports.

8. A curved patch panel according to claim 1, wherein said length extent is at least one of arcuate, sectionally arcuate, multi-sectioned arcuate, or parabolic.

9. A curved patch panel according to claim 8, wherein said elongated patch panel element exhibits an arc height of between about one-half (0.5) and about two and one-half (2.5) inches.

10. A curved patch panel according to claim 8, wherein said elongated patch panel element exhibits at least one arc radius.

11. A curved patch panel according to claim 9, wherein said at least one arc radius is between about twenty (20) and about thirty (30) inches.

12. A curved patch panel according to claim 1, further comprising an appliqué adhered to said elongated patch panel element, said appliqué including indicia printed thereon.

13. A curved patch panel according to claim 1, wherein said first and second flange members are integrally formed with respect to said elongated patch panel element.

14. A curved patch panel according to claim 2, wherein each of said mounting face and extension arm is formed from a unitary structure through a pair of bends.

15. A curved patch panel according to claim 1, wherein each said mounting face includes a plurality of apertures configured and dimensioned for mounting said curved patch panel with respect to a rack or console.

16. A curved patch panel according to claim 2, wherein each of said extension arms exhibits a length of between about one-half (0.5) and about one and one-half (1.5) inches.

17. A curved patch panel according to claim 1, further comprising at least one wire management bracket mounted with respect to a rear face of said elongated patch panel element.

18. A curved patch panel according to claim 1, further comprising at least one cable manager mounted with respect to a front face of said elongated patch panel element.

19. A curved patch panel according to claim 1, wherein said at least one curved portion configured and dimensioned to receive a jack module for mounting with respect to said elongated patch panel element at least includes a first curved portion configured and dimensioned to receive a first jack module and a second curved portion configured and dimensioned to receive a second jack module, and wherein said length extent further includes a third curved portion including said peak region and disposed between said first curved portion and said second curved portion.

20. A curved patch panel assembly, comprising:
(a) a rack, said rack including first and second spaced rack support elements;
(b) a curved patch panel mounted to said rack, said curved patch panel including:
  (i) an elongated patch panel element, said elongated patch panel element defining respective first and second ends, having a length extent extending from said first end to said second end, and exhibiting a peak region disposed along said length extent between said first end and said second end, said length extent being predominantly curved, including wherein said length extent includes at least one curved portion configured and dimensioned to receive a jack module for mounting with respect to said elongated patch panel element; and
  (ii) first and second flange members, each of said first and second flange members extending from a respective one of said first end and said second end of said elongated patch panel element, each of said first and second flange members further including a mounting face, each said mounting face oriented substantially parallel to said peak region, and configured for mounting said curved patch panel to said rack via said first and second spaced rack support elements.

21. A curved patch panel assembly according to claim 20, further including first and second extension arms, each of said first and second extension arms being operably connected between a respective one of said first end and said second end of said elongated patch panel element and a respective one of said first flange member and said second flange member, and facilitating said elongated patch panel element being substantially recessed relative to said rack.

22. A curved patch panel assembly according to claim 21, wherein each of said extension arms exhibits a length of between about one-half (0.5) and about one and one-half (1.5) inches.

23. A curved patch panel assembly according to claim 20, wherein said length extent is at least one of arcuate, sectionally arcuate, multi-sectioned arcuate, or parabolic.

24. A curved patch panel assembly according to claim 23, wherein said elongated patch panel element exhibits an arc height of between about one-half (0.5) and about two and one-half (2.5) inches.

25. A curved patch panel assembly according to claim 23, wherein said elongated patch panel element exhibits at least one arc radius.

26. A curved patch panel assembly according to claim 25, wherein said at least one arc radius is between about twenty (20) and about thirty (30) inches.

27. A curved patch panel assembly according to claim 20, wherein said length extent includes a first curved portion defining a curved mounting face and an opening formed in the curved mounting face, the opening being configured and dimensioned to receive a jack module, and wherein said curved patch panel further comprises a jack module positioned in the opening, wherein said jack module defines a planar front face.

28. A curved patch panel assembly according to claim 20, further comprising at least one wire management bracket mounted with respect to a rear face of said elongated patch panel element.

29. A curved patch panel assembly according to claim 20, further comprising at least one cable manager mounted with respect to a front face of said elongated patch panel element.

30. A curved patch panel assembly according to claim 20, wherein said at least one curved portion configured and dimensioned to receive a jack module for mounting with respect to said elongated patch panel element at least includes a first curved portion configured and dimensioned to receive a first jack module, and a second curved portion configured and dimensioned to receive a second jack module, and wherein said length extent further includes a third curved portion including said peak region and disposed between said first curved portion and said second curved portion.

31. A curved patch panel, comprising:
(a) an elongated patch panel element, said elongated patch panel element defining respective first and second ends and having a length extent extending from said first end to said second end, said length extent being predominantly curved, including wherein said length extent includes a curved portion defining a curved mounting face and an opening formed in the curved mounting face and configured and dimensioned to receive a jack module; and
(b) first and second flange members, each of said first and second flange members extending from a respective one of said first end and said second end of said elongated patch panel element for mounting the curved patch panel to a rack.

32. A curved patch panel according to claim 31, further comprising a jack module positioned in the opening, wherein said jack module defines a planar front face.

33. A curved patch panel according to claim 32, wherein each said jack module includes six linearly aligned ports.

34. A curved patch panel according to claim 31, wherein said length extent is at least one of arcuate, sectionally arcuate, multi-sectioned arcuate, or parabolic.

35. A curved patch panel according to claim 31, wherein said at least one curved portion configured and dimensioned to receive a jack module at least includes a first curved portion configured and dimensioned to receive a first jack module, and a second curved portion configured and dimensioned to receive a second jack module, and wherein said length extent further includes a third curved portion including said peak region and disposed between said first curved portion and said second curved portion.

* * * * *

UNITED STATES PATENT AND TRADEMARK OFFICE
CERTIFICATE OF CORRECTION

PATENT NO.         : 7,591,676 B2
APPLICATION NO. : 11/347628
DATED                   : September 22, 2009
INVENTOR(S)         : Mark E. Martich and Stewart A. Levesque It is certified that error appears in the above-identified patent and that said Letters Patent is hereby corrected as shown below:

The title page showing the illustrative figure should be deleted to be replaced with the attached title page.

The drawing sheets, consisting of Figs. 1-9, should be deleted to be replaced with the drawing sheets, consisting of Figs. 1-9, as shown on the attached pages.

In the Drawings

Elimination of the "rear flange" from flange member 110 on both sides of the curved or arcuate patch panel element 102 in Figure 2;

Elimination of the "bottom flange" from flange member 110 on both sides of the curved or arcuate patch panel element 102 in Figure 5;

Elimination of the "top flange" from flange member 110 on both sides of the curved or arcuate patch panel element 102 in Figure 6; and Elimination of numerals 110 and the lead line/arrow to the "top flange" in figure 6; and Addition of numeral 110a and the lead line/arrow to the "side flange" in Figure 6.

Signed and Sealed this

Twenty-ninth Day of December, 2009

David J. Kappos
*Director of the United States Patent and Trademark Office*

(12) United States Patent
Martich et al.

(10) Patent No.: US 7,591,676 B2
(45) Date of Patent: Sep. 22, 2009

(54) ARCUATE PATCH PANEL ASSEMBLY

(75) Inventors: Mark E. Martich, Barrington, RI (US); Stewart A. Levesque, Scotland, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 11/347,628

(22) Filed: Feb. 3, 2006

(65) Prior Publication Data

US 2007/0184712 A1  Aug. 9, 2007

(51) Int. Cl.
 H01R 13/60 (2006.01)
(52) U.S. Cl. .............................................. 439/540.1
(58) Field of Classification Search ............ 439/540.1, 439/533, 719, 532, 557–558; 385/55, 134–135
 See application file for complete search history.

(56) References Cited

U.S. PATENT DOCUMENTS

| | | |
|---|---|---|
| 4,630,886 A | 12/1986 | Lauriello et al. |
| 4,824,196 A | 4/1989 | Bylander |
| 4,995,688 A | 2/1991 | Anton et al. |
| 5,011,257 A | 4/1991 | Wettengel et al. |
| 5,129,842 A | 7/1992 | Morgan et al. |
| RE34,955 E | 5/1995 | Anton et al. |
| 5,530,954 A | 6/1996 | Larson et al. |
| 5,788,087 A | 8/1998 | Orlando |
| 5,903,698 A | 5/1999 | Poremba et al. |
| 6,293,707 B1 | 9/2001 | Wild |
| RE37,489 E | 1/2002 | Anton et al. |
| 6,537,106 B1 | 3/2003 | Follingstad |
| 6,600,106 B2 | 7/2003 | Standish et al. |
| 6,866,541 B2 | 3/2005 | Barker et al. |
| 6,901,200 B2 | 5/2005 | Schray |
| 6,918,786 B2 | 7/2005 | Barker et al. |
| 6,971,909 B2 | 12/2005 | Levesque et al. |
| 6,981,893 B2 | 1/2006 | Barker et al. |
| 7,070,459 B2 | 7/2006 | Denovich et al. |
| 7,094,095 B1 * | 8/2006 | Caveney ............... 439/540.1 |
| 2003/0022552 A1 | 1/2003 | Barker et al. |
| 2004/0209515 A1 | 10/2004 | Caveney et al. |

OTHER PUBLICATIONS

Eric W. Weisstein, Circular Segment, Mathworld, Wolfram Web Resource, http://mathworld.wolfram.com/CircularSegment.html, 3 pages.

(Continued)

*Primary Examiner* — Jean F Duverne
(74) *Attorney, Agent, or Firm* — McCarter & English, LLP

(57) ABSTRACT

A curved or arcuate patch panel is configured to be mounted to a rack or console. The patch panel facilitates cable management functions and enhances space utilization at and around the rack/patch panel assembly. The patch panel includes an elongated patch panel element having a predominantly curved length extent and exhibiting a peak region, preferably located at the center of the patch panel. The patch panel also includes flange members that extend from the elongated patch panel element, and that define a mounting face for the patch panel. Optionally, the flange members further define an extension arm that is intermediate to the mounting face and the elongated patch panel element. The extension arm is dimensioned to facilitate at least partial recessing of the elongated patch panel element relative to the rack/console when the patch panel is mounted thereto.

35 Claims, 5 Drawing Sheets